United States Patent Office 3,115,311
Patented Dec. 24, 1963

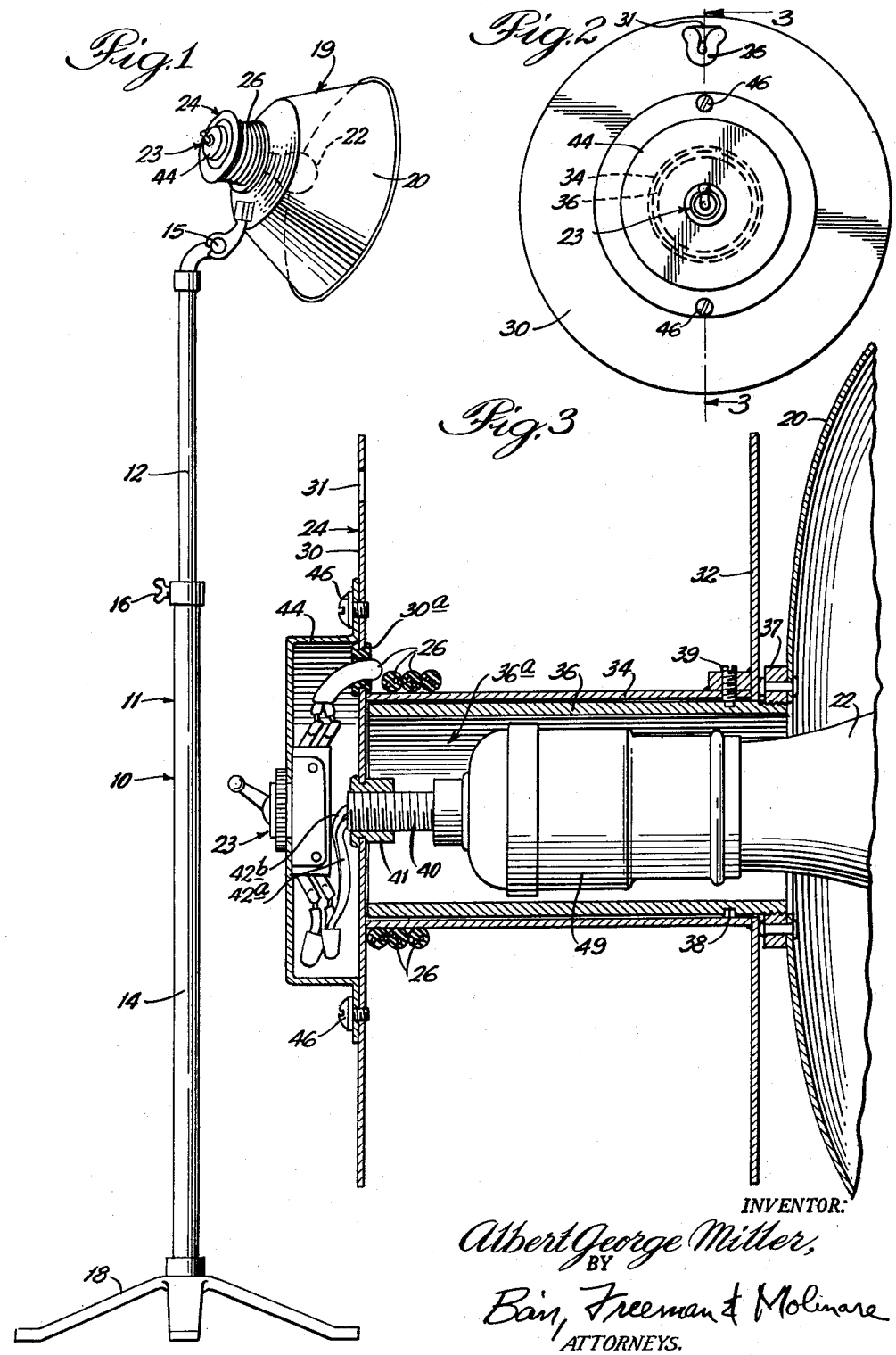

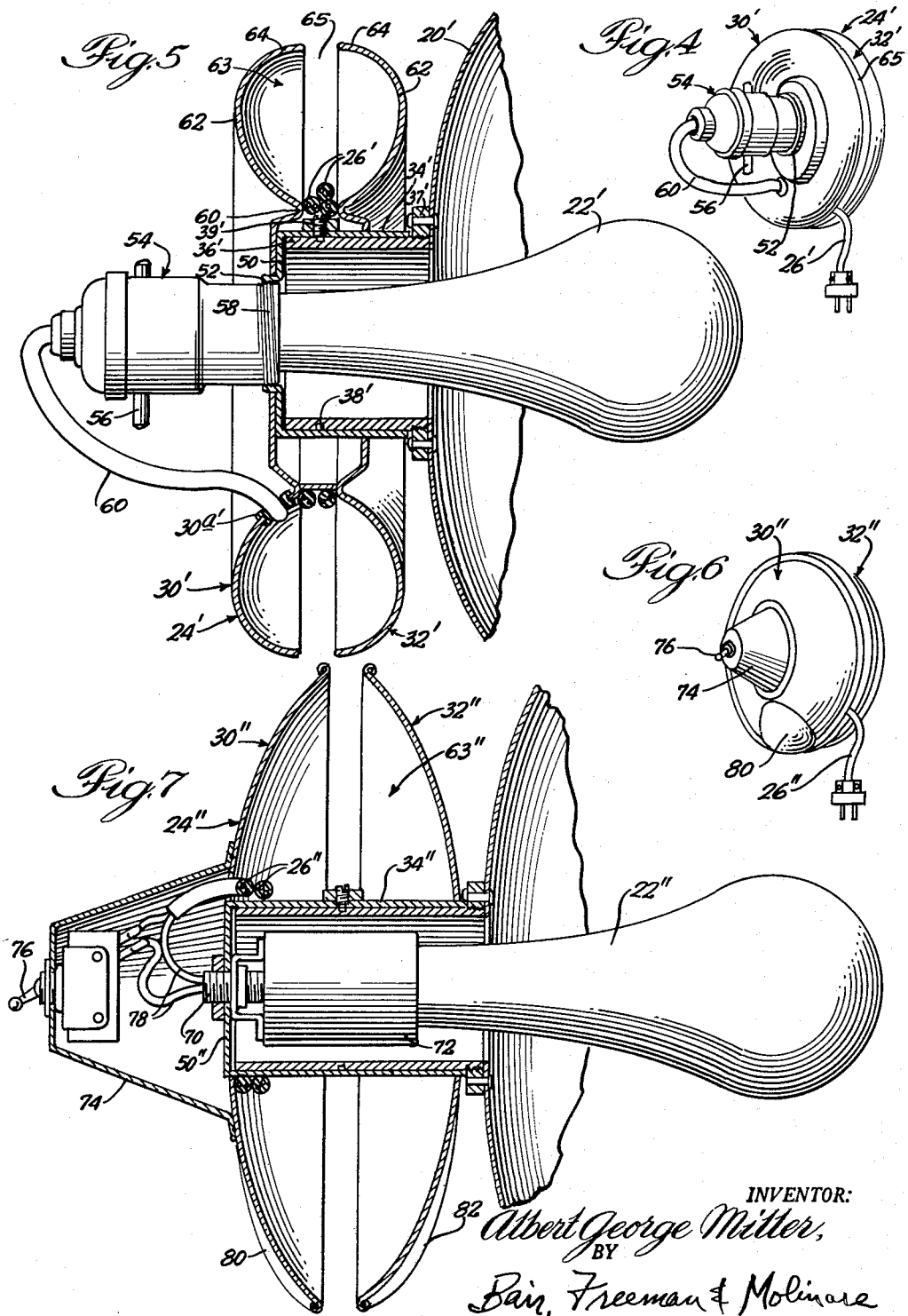

3,115,311
PHOTOGRAPHIC REFLECTOR AND CORD REEL THEREFOR
Albert George Miller, 25 E. Cedar St., Chicago 11, Ill.
Filed May 22, 1961, Ser. No. 111,708
10 Claims. (Cl. 240—81)

This invention relates in general to an electrical connection arrangement for a light reflector and more particularly to an arrangement for carrying the cable therefor, and through which an electrical connection is extended to the lamp.

As may be appreciated, and for example, photoflood or photographic light reflectors have considerable use in photographic studios for lighting subjects or models. The lamps each comprising a stand, a light reflector, a light bulb, and attendant electrical connections are moved about from position to position depending on the lighting needs. The result is that the electrical cords or cables lie haphazardly over considerable floor area and often become intertwined with each other and/or other objects. In addition there is created some difficulty in movement and hazards to personnel from tripping or falling over the cords.

This invention, therefore, proposes the utilization of a reel member for each light reflector whereby the electrical cord extending from each lamp may be conveniently coiled upon the reel or uncoiled therefrom. Thus, the free length of the cord is easily limited only to that necessary. With this arrangement the cord length is controlled so as to reduce the possibility of either its entanglement or hazards to personnel.

Another object is the provision of a light reflector with a cord-carrying reel attached, and wherein the lamp and switch therefor are arranged in novel manner relative to the reflector so that no electrical slip ring connections need be used.

And another object of this invention is to provide an improved light reflector and cord reel combination which is characterized by its desirable characteristics for use in photograph work and by its simplicity and effectiveness of operation and by its inexpensiveness of construction.

A further object of this invention is to provide an improved cord reel for a light reflector, which cord reel is so shaped as to permit of ready manual grasping thereof to effect selective rotation of the reel.

And another object of this invention is to provide a cord reel for a light reflector, which cord reel is so constructed and arranged as to normally resist tendency of the cord on the reel to inadvertently unreel.

Other objects and features of this invention will become apparent upon examination of the following specification, claims and drawings.

FIGURE 1 is a view of a photoflood lamp whose light reflector has been constructed in accordance with this invention;

FIGURE 2 is an enlarged rear view of the reel and reflector portion of the lamp of FIGURE 1;

FIGURE 3 is a greatly enlarged cross-section view taken along the line 3—3 of FIGURE 2;

FIGURE 4 is a perspective rear view of a modified form of light reflector with cord reel therefor;

FIGURE 5 is an enlarged, fragmentary, axial cross-section view of the form of device shown in FIGURE 4;

FIGURE 6 is a perspective view similar to FIGURE 4 showing another form of the invention; and FIGURE 7 is a view similar to FIGURE 5 but showing the details of the form of device shown in FIGURE 6.

Turning now to the drawings, a light reflector, and particularly a photoflood lamp, is illustrated generally in FIGURE 1 by the reference character 10. The lamp 10 comprises an adjustable standard 11 having telescopically adjustable members 12 and 14 and a plurality of support legs 18. The upper member 12 is telescopically received in the lower member 14 and the height of standard 11 may be adjusted by means of the wing nut 16. At the upper end of the member 12 a pivotal connection 15 is provided for the purpose of permitting the photoflood assembly 19 to be adjusted for casting light in a desired direction.

The improved photoflood assembly 19 includes a light reflector 20, which may typically be convex or frusto-conical, a lamp bulb 22, in reflective association with said reflector, and a reel assembly, generally indicated at 24 upon which is coiled the electrical cord 26 for the lamp. The electrical cord 26 furnishes the means for providing electrical power to the light bulb 22 by connection to an electrical outlet (not shown). A switch 23 is mounted on the reel assembly 24 for rotation therewith. The switch 23 is interposed between cord 26 and bulb 22 and serves to complete or terminate the electrical connection to the lamp 22 depending on the switch position.

The reel assembly 24 comprises two spaced, circular cord-retaining discs 30 and 32 joined by a tubular hub element or sleeve 34 which is best seen in FIGURE 3. The disc 30 is provided with an aperture or slot 31, as best seen in FIGURES 2 and 3, into which may be inserted folded portion of the cord 26 adjacent the service plug thereof. This operates to retain the cord 26 on reel 24 and prevents inadvertent unreeling of cord 26. The hub 34 is rotatably mounted upon an elongated tubular bearing element, or axle, 36 which is secured by threaded connector sleeve 37 to reflector 20 and which is provided with a circular groove 38 therein adjacent one end. A suitable retainer screw member 39 is provided on reel 24 which projects through the hub 34 and enters the groove 38 to prevent the hub 34 together with discs 30 and 32 from moving axially with respect to the hub 34. This is done without interfering with the rotation of hub 34 on axle 36. The axle 36 is secured to reflector 20 in any appropriate manner, and as shown is threaded at one end for engagement with a female-threaded nut 37 on the reflector 20. The tubular axle 36 provides a recess, or space, 36a that is axial of reel 24 and which is spaced axially rearwardly of reflector 20 for purposes appearing hereinafter.

The lamp 22 is carried by an electric socket 49 that is located in space 36a, in spaced relation from axle 36. The socket 49 is, in turn, carried by a threaded nipple 40. The nipple 40 is engaged by a sleeve-type coupling element 41 carried by the disc 30. The electrical connection to the lamp 22 extends from the coiled cord 26 on reel 24 through the aperture in grommet 30a carried in an opening in disc 30 to the switch 23, and from the switch 23 to the wires 42a and 42b which extend through the nipple 40 to the socket 49. The switch 23 is carried by the cup-shaped bracket plate 44 which in turn is mounted on the disc 30 by screws 45. The plate 44 is of a size to overlie grommet 30a through which extends cord 26 from the coil to switch 23, and to hide the wire connections between cord 26 and switch 23 and between switch 23 and leads 42a and 42b.

If it is desired to move the lamp 10 from one position to another and if in such other position the lamp is closer to the electrical outlet than in the first position, there will be an excess length of the cord extending from lamp 10. The lamp 10 is simply moved and the reel assembly 24 may be rotated to wind up the excess of cord 26 in a coil upon reel 24. The tautness of cord 26 may be regulated as desired, and such tautness can not pull the reel assembly 24 from axle 36, as screw 39 maintains the parts in engagement. It will be noted that the reel 24 may be rotated, for example, by simply moving disc 30 manually, but the rotation may be accomplished by a spring bias or other means. During rotation of the reel assembly 24, the switch 23, nipple 40, socket 49 and lamp 22, together with the coil of cord 26 on reel 24, are all simultaneously rotated. Thus, by rotating the light bulb, socket and switch as a unit with reel 24, the relative positions between those components is maintained, and thereby prevents entanglement of the cord.

On the other hand, if the cord is to be lengthened to permit the lamp 10 to be moved further from the power source, the lamp is simply moved. If the cord 26 is connected to a power outlet it may become taut so that it simply reels itself off the reel 24. If not connected with the power outlet, the lamp is placed in the desired position and only the amount of cord necessary to make the connection is then unreeled from the reel assembly.

In FIGURES 4 and 5 there is shown a modified form of the invention provided with improvement features. The elements of FIGURES 4 and 5 which correspond with those elements of FIGURES 1-3 are similarly numbered and carry a prime mark. Thus, a light reflector 20' with connector sleeve 37' is secured to tubular axle 36' upon which is rotatably mounted an annular sleeve, or hub, 34'. The hub 34' defines a radially inwardly extending end flange 50 having a female threaded axial stub sleeve 52 into which threads a combination switch-and-light socket, generally indicated at 54. The combination switch-and-light socket 54, with push-button switch 56 and male-threaded sleeve 58, is of well-known standard construction used in the lamp art, with the threaded sleeve 58 normally serving as a fastening means to which may connect a lamp shade or the like. The socket 54 serves as the axial mounting for a light bulb 22' arranged in reflective association with reflector 20'.

A light cord 60 leads from socket 54 through a grommet 30a' in one disc of reel assembly 24'. The reel assembly 24' includes spaced, circular, cord-retaining discs, or flanges, 30' and 32' that are carried on hub 34'. The discs 30' and 32' are each shaped to define, in sequence radially of hub 34', a necked-in portion 60, a rounded belled-out portion 62, and an inturned terminal end 64. The complementary belled-out portions 62 define therebetween an annular space 63 into which coiled light cord 26' is to be stored on reel 24'. The radial outermost portions, or ends, 64 extend axially of hub 34' toward each other but are spaced from each other to define therebetween a peripheral control slot, or opening, 65 that is slightly larger than the size of cord 26' and through which the reel-mounted cord 26' extends. The spaced flanges 30' and 32' with belled-out portions 62 are thereby shaped to define a circular handgrasp toroid portion, or means which permits of easy grasping for selective rotary manual manipulation of the reel means 24' on axle 36'.

The hub 34' carries a central boss in which is screw-mounted a retainer member 39' whose tip effects slidable entry into circular groove 38' defined on axle 36'. The slot 65 affords entry of the stem of a screwdriver to effect selective manipulation of retainer screw 39'. Although bulb 22' is mounted coaxial of axle 36' and of reflector 20', the center of gravity C.G. of reel means 24' is offset, or eccentric of, the axis of axle 36'. This predisposes the reel means 24' to assume one specific attitude on axle 36', namely, with C.G. below the axis of the axle 36', and this arrangement effectively prevents inadvertent unreeling of cord 26' from the reel means 24'.

In FIGURES 6 and 7 there is shown still another form of the invention provided with additional improvement features. The elements of FIGURES 6 and 7 which correspond with those elements of FIGURES 4 and 5 are similarly numbered and carry a double prime mark. Thus, reel assembly 24", that is rotatably mounted on sleeve 36", includes a pair of spaced flanges 30" and 32" on hub 34" defining a cord-storing space 63", and hub 34" carries an end flange 50" to which threads a tubular stud 70 on which is axially mounted a light socket 72 from whence extends a light bulb 22". The flanges 30" and 32" are spaced closely to provide a circular handgrasp means for rotation of the reel means 24". The flange 30" carries a switch housing 74 on which is axially mounted a toggle switch 76 that is interposed between light cord 26" and a cord extension 78 that extends axially through stud 70 to socket 72. The center of gravity of reel means 24" is made eccentric of the axis of axle 36" by adding weights 80 and 82 to the exterior of flanges 30" and 32", and thereby inadvertent unreeling of the light cord from the reel means 24" is effectively prevented.

While the device shown in the drawings and described hereinabove is a photographic appliance using an incandescent light, it will be understood that the same invention may be incorporated in any light reflector for any use, and other types of source of light, such as a stroboscopic light, may be substituted.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An electrical cord-carrying assembly for a light reflector wherein a light bulb is adapted to be energized from an electrical power source connected thereto through a cord, the improvement comprising a reflector element fixedly carrying a stationary tubular element and adapted to receive a portion of said bulb thereinto, support means operatively carrying said reflector element, a reel assembly rotatably mounted on said tubular element and carrying socket means thereon supporting a bulb for rotation therewith, said reel assembly being rotatable for either wrapping said cord in a coil thereon or unwrapping said cord therefrom, means for limiting axial movement of said reel assembly relative to said tubular member and means on said reel assembly providing an electrical connection between said cord and said socket means substantially along the axis of rotation of said reel assembly, whereby said electrical connection may be maintained without being twisted during rotation of said reel assembly.

2. A device as set forth in claim 1 including a switch mounted on said reel assembly for rotation therewith for controlling said electrical connection.

3. A device as set forth in claim 1 in which said reel assembly comprises a pair of spaced discs interconnected by a hub element adapted to rotate on said tubular element, and one of said discs carrying the socket means for engagement with said bulb and providing a central aperture through which the electrical connection is extended.

4. A device as set forth in claim 3 in which a switch is carried by said one disc for controlling said electrical connection and said disc providing an aperture through which a connection is extended from the coiled cord to said switch.

5. An electrical cord-carrying assembly for a light reflector wherein a light bulb is adapted to be lighted from an electrical power source connected thereto through a cord and wherein said bulb is partially surrounded by a light reflector element, the improvement comprising an elongated hollow axle carrying said reflector element at one end thereof, a disc rotatably mounted on said axle and carrying for rotation therewith a socket extending axially within said hollow axle for engagement with said bulb, means on said disc for carrying a coil of said cord, and means on said disc providing an electrical connection between said coil and said socket, thereby providing that said disc, socket and bulb may be simultaneously rotated for either reeling or unreeling said cord without entangling the electrical connection between said coil and said socket.

6. A device as set forth in claim 5 in which said electrical connection includes a switch mounted on said disc and rotatable therewith.

7. A device as set forth in claim 5 including means for limiting axial movement between said disc and said axle, said means including a retainer pin carried by said disc and entering a circular groove in said axle.

8. A lighting appliance comprising, in combination: a stationary reflector having an opening therethrough, an internally recessed bearing on said reflector with said internal recess aligned with said opening, reel means rotatably mounted on said bearing, socket means disposed in said internal recess and supported by said reel means for rotation therewith and adapted to carry a light bulb disposed in reflective association with said reflector, electric cord means carried by said reel means, and electrical connection means between said cord means and said socket means carried by said reel means for rotation therewith and extending into said internal recess of said bearing for connection to said socket means.

9. A lighting appliance comprising, in combination: a stationary light reflector, stationary tubular axle means on said reflector, a light cord-carrying reel assembly rotatably mounted on said axle and carrying for rotation therewith socket means adapted to support a light bulb extending coaxially of said tubular axle, said reel assembly including a sleeve rotatably mounted on said axle, a pair of spaced annular flanges fixedly connected on said sleeve defining therebetween a space into which coiled light cord is to be stored on said reel, and the radial outermost portions of said flanges being turned axially toward each other into close juxtaposed relationship to define a light cord opening therebetween through which the reel-mounted cord extends.

10. A lighting appliance comprising, in combination: a stationary light reflector, stationary tubular axle means on said reflector, a light cord-carrying reel assembly rotatably mounted on said axle and carrying for rotation therewith socket means adapted to support a light bulb extending coaxially of said tubular axle, said reel assembly including a sleeve rotatably mounted on said axle, a pair of spaced annular flanges on said sleeve defining therebetween a space into which coiled light cord is to be stored on said reel assembly, and the reel assembly having a center of gravity eccentric with respect to the axis of said axle means to prevent inadvertent unreeling of cord from the reel assembly.

References Cited in the file of this patent

UNITED STATES PATENTS

| | | |
|---|---|---|
| Re. 15,102 | Nikonow | May 10, 1921 |
| 914,772 | Williamson | Mar. 9, 1909 |
| 1,418,462 | Potstada | June 6, 1922 |
| 1,659,013 | Anderson | Feb. 14, 1928 |
| 2,708,375 | Layton et al. | May 17, 1955 |

FOREIGN PATENTS

| | | |
|---|---|---|
| 4,162 | Great Britain | Aug. 31, 1882 |